(12) United States Patent
Dianetti et al.

(10) Patent No.: US 10,957,884 B1
(45) Date of Patent: Mar. 23, 2021

(54) MINIATURE ELECTROCHEMICAL CELLS HOUSED IN A METALLIC CASING HAVING A GLASS-TO-METAL SEAL ISOLATING THE OPPOSITE POLARITY TERMINALS

(71) Applicant: Greatbatch Ltd., Clarence, NY (US)

(72) Inventors: David Dianetti, Lancaster, NY (US); Gary Freitag, East Aurora, NY (US); Robert S. Rubino, Williamsville, NY (US); Keith W. Seitz, Clarence Center, NY (US); Ho-Chul Yun, East Amherst, NY (US); Todd C. Sutay, Warsaw, NY (US); Brian P. Hohl, Clarence, NY (US); David Wutz, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 247 days.

(21) Appl. No.: 16/240,850

(22) Filed: Jan. 7, 2019

Related U.S. Application Data

(60) Provisional application No. 62/614,679, filed on Jan. 8, 2018.

(51) Int. Cl.
| | |
|---|---|
| *H01M 2/02* | (2006.01) |
| *H01M 2/08* | (2006.01) |
| *H01M 2/30* | (2006.01) |

(52) U.S. Cl.
CPC ........... *H01M 2/022* (2013.01); *H01M 2/026* (2013.01); *H01M 2/028* (2013.01); *H01M 2/08* (2013.01); *H01M 2/30* (2013.01)

(58) Field of Classification Search
CPC ......... H01M 2/022; H01M 2/028; H01M 2/08
(Continued)

(56) References Cited

U.S. PATENT DOCUMENTS

| | | |
|---|---|---|
| 6,782,290 B2 | 8/2004 | Schmidt |
| 6,818,356 B1 | 11/2004 | Bates |

(Continued)

FOREIGN PATENT DOCUMENTS

| | | |
|---|---|---|
| DE | 102011103975 A1 | 12/2012 |
| EP | 0269007 A1 | 6/1988 |

(Continued)

OTHER PUBLICATIONS

Extended European Search Report, Application No. 19150718.5, dated Apr. 4, 2019.

*Primary Examiner* — James M Erwin
(74) *Attorney, Agent, or Firm* — Michael F. Scalise

(57) ABSTRACT

A miniature electrochemical cell having a total volume that is less than 0.5 cc is described. The casing enclosure consists of a lower plate supporting a cylindrically-shaped can having an open upper end closed with a cover. The can is selectively coated with a dielectric material to provide electrical isolation of the to-be-housed active materials from the can sidewall. A glass-to-metal seal electrically isolates the lower plate from the can. An electrode assembly comprising a sandwich of cathode active material/separator/anode active material is housed in the casing. That way, the lower plate contacting the cathode active material is the positive terminal and the closing cover connected to the can and contacted to the anode active material serves as the negative cell terminal. An electrolyte filled into the casing activates the electrode assembly and the fill opening is sealed with a plug. The cell can be of either a primary or a secondary chemistry.

20 Claims, 4 Drawing Sheets

(58) Field of Classification Search
USPC .......................................................... 429/405
See application file for complete search history.

(56) References Cited

U.S. PATENT DOCUMENTS

| | | | |
|---|---|---|---|
| 7,341,802 B1 * | 3/2008 | Ota | H01M 2/065 |
| | | | 429/181 |
| 7,524,577 B2 | 4/2009 | Bates | |
| 7,553,582 B2 | 6/2009 | Bates | |
| 7,811,702 B2 | 10/2010 | Laurent et al. | |
| 8,679,674 B2 | 3/2014 | Liang et al. | |
| 8,778,532 B2 | 7/2014 | Salot et al. | |
| 8,815,450 B1 | 8/2014 | Bates | |
| 8,865,340 B2 | 10/2014 | Liang et al. | |
| 9,599,842 B2 | 3/2017 | Flitsch et al. | |
| 9,793,522 B2 | 10/2017 | Bhardwaj et al. | |
| 9,887,403 B2 | 2/2018 | Huang et al. | |
| 2005/0007718 A1 | 1/2005 | Stevenson et al. | |
| 2010/0129717 A1 | 5/2010 | Bedjaoui et al. | |
| 2015/0004478 A1 | 1/2015 | Prinzbach et al. | |
| 2016/0254566 A1 | 9/2016 | Pepin et al. | |

FOREIGN PATENT DOCUMENTS

| | | | |
|---|---|---|---|
| EP | 2262036 B1 | 3/2012 | |
| EP | 2192638 B1 | 4/2013 | |
| EP | 2469620 B1 | 8/2013 | |

\* cited by examiner

MINIATURE ELECTROCHEMICAL CELLS HOUSED IN A METALLIC CASING HAVING A GLASS-TO-METAL SEAL ISOLATING THE OPPOSITE POLARITY TERMINALS

CROSS-REFERENCE TO RELATED APPLICATION

This application claims priority to U.S. Provisional Application Ser. No. 62/614,679, filed on Jan. 8, 2018.

BACKGROUND OF THE INVENTION

1. Field of the Invention

This invention relates to the conversion of chemical energy to electrical energy. More particularly, the present invention relates to an electrochemical cell having a total size or volume that is less than 0.5 cc. Such so-called miniaturized electrochemical cells enable numerous new and improved medical device therapies. Miniature electrochemical cells are defined as those having a size or total volume that is less than 0.5 cc.

2. Prior Art

Electrochemical cells must have two opposite polarity terminals that are electrically isolated from each other. In use, the terminals are connected to a load, such as the circuitry in an implantable medical device to power the medical device. In that respect, an electrochemical cell which is sufficiently hermetic to prevent ingress of moisture and egress of electrolyte so that the cell can operate for 10 years or more requires robust sealing methodologies while still providing adequate electrical isolation between the opposite polarity terminals. However, conventional sealing techniques are often not practical when cell size drops below 0.5 cc. That is because the seals themselves take up a major portion of the overall cell volume.

A coin cell construction is a convenient configuration for the assembly of small cells. Conventional coin cells typically have a metal base and a metal lid, which are electrically isolated from each other by a plastic gasket. The cell is sealed by crimping the base around the plastic gasket. The gasket electrically isolates the base from the lid so that the base and lid serve as opposite polarity terminals for the cell. The problem is that a seal formed by crimping a plastic gasket is not easy to form consistently and, even when crimped according to design, is porous and not considered to be hermetic. The gasket becomes an escape path for electrolyte egress or ingress of atmospheric contaminants that can disrupt charging and discharging of the cell. For example, ingress of water is particularly problematic for lithium cells. Thus, crimped plastic seals may not provide the consistent longevity required for some applications.

Additionally, the plastic seal and crimp have a certain volume requirement at the cell periphery that reduces space which can otherwise be used for active materials such as the opposite polarity electrodes and activating electrolyte, thereby reducing cell capacity and volumetric efficiency. Reduced capacity means that the cell may not have sufficient energy per unit volume to power the associated electronic device. Further, there is a limit to how small a crimp seal can be made so that below a certain size, it may not be possible to construct the cell at all.

Moreover, since secondary electrochemical cells activated with a solid electrolyte typically undergo expansion and contraction during charging and discharging, they require hermetic encapsulation approaches that suitably accommodate this cycling induced dimensional change. Those types of hermetic enclosures for miniature electrochemical cells do not currently exist.

For that reason, the present invention provides encapsulation techniques that are suitable for use with hermetically sealed electrochemical cells of both primary and secondary chemistries. For rechargeable cells, the present enclosures have sufficient dimensional flexibility to accommodating the required dimensional changes during cycling. While useful with cells of virtually any size, the present encapsulation techniques are particularly well suited for cells having a total volume or size that is less than 0.5 cc.

SUMMARY OF THE INVENTION

The present invention describes various electrochemical cell constructions which are readily adapted to miniature cell designs. The casing enclosure consists of three main components: a lower plate supporting a cylindrically-shaped can having an open upper end closed with a cover. The can is selectively coated with a dielectric material to provide electrical isolation of the to-be-housed cathode active material from the can sidewall. A sealing glass is applied to the perimeter of the lower plate with the cylindrically-shaped can supported on the glass. The can and plate are heated to a temperature that is sufficient to achieve a glass-to-metal seal between them. The thickness of the sealing glass combined with the glass seal bonds at the plate and at the can are sufficient to ensure electrical isolation between the lower plate and the supported can.

A layer of cathode active material is deposited into the cavity formed by the lower plate/can subassembly. In this position, the cathode active material is in electrical contact with the inner exposed surface of the plate, which serves as the positive terminal for the cell, but is electrically isolated from the can by the above described dielectric layer.

A separator material is supported on top of the cathode active material. A layer of anode active material is in turn supported on the separator. A metallic cover is seated on an inner step of the can and the cover and can are welded together to hermetically seal the casing. In this position, the closing cover connected to the can is in contact with the anode active material to thereby serve as the negative terminal for the cell. Finally, electrolyte is filled into the casing enclosure to activate the electrode assembly and the fill opening is sealed with a closure member welded in the opening.

In an alternate embodiment, there is no electrolyte fill opening. Instead, electrolyte is filled into the electrode assembly before the closure cover is hermetically connected to the can. This precludes the need for a fill opening and closure system.

Depending on the desired orientation of the opposite polarity terminals for the finished cell, relative positioning of the anode and cathode active materials can be reversed. In this alternate embodiment, the lower cover is the negative terminal in contact with anode active material and the can/upper closing cover in contact with cathode active material serves as the positive terminal.

While the present cell designs are adapted for miniature electrochemical cells, they are also applicable to cells that have a total volume that is greater than 0.5 cc and are not classified as "miniature". Moreover, the present electrochemical cells are not limited to any one chemistry and can be of an alkaline cell, a primary lithium cell, a rechargeable lithium cell, a Ni/cadmium cell, a Ni/metal hydride cell, a supercapacitor, a thin film solid-state cell, and the like. One preferred chemistry is a lithium-ion electrochemical cell comprising a carbon-based or $Li_4Ti_5O_{12}$-based anode and a lithium metal oxide-based cathode, such as of $LiCoO_2$ or lithium nickel manganese cobalt oxide ($LiNi_aMn_bCo_{1-a-b}O_2$). The electrochemical cell is activated with a liquid electrolyte.

The present invention is also useful with a solid-state thin film electrochemical cell having a lithium anode, a lithium metal-oxide based cathode and a solid electrolyte, such as an electrolyte of LiPON ($Li_xPO_yN_z$).

These and other aspects of the present invention will become increasingly more apparent to those skilled in the art by reference to the following detailed description and to the appended drawings.

DETAILED DESCRIPTION OF THE PREFERRED EMBODIMENTS

Figure 1:
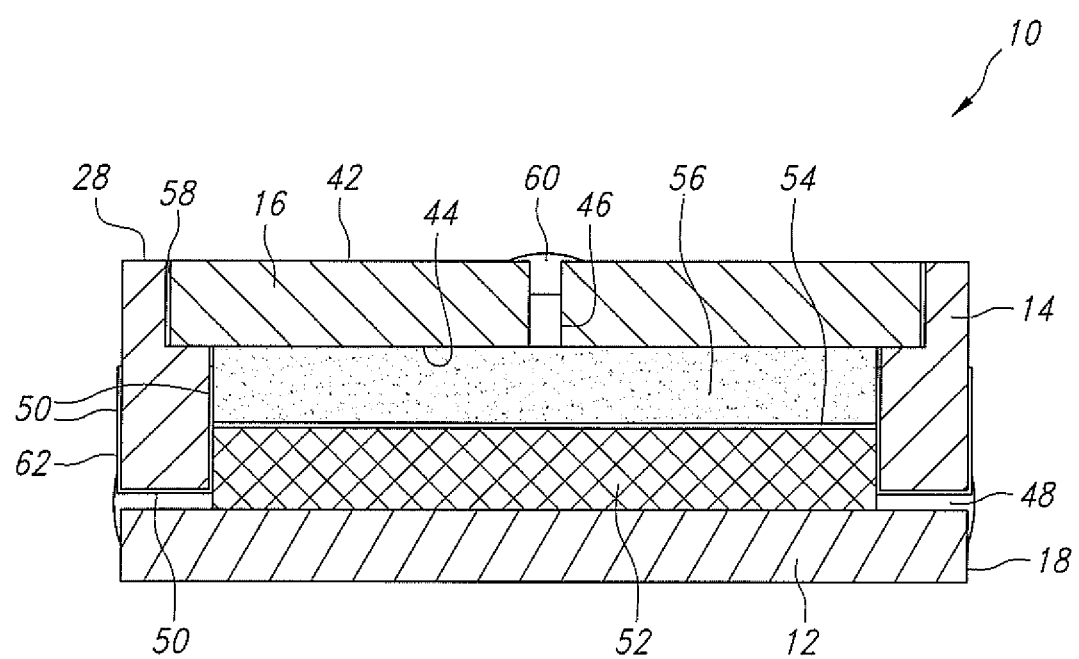
FIG. 1 is a cross-sectional view of an electrochemical cell 10 according to the present invention.

Turning now to the drawings, FIG. 1 is a cross-sectional view of an electrochemical cell 10 according to the present invention. The cell 10 comprises an electrode assembly housed in a hermetically sealed casing. The casing comprises a lower plate 12 supporting an annular can 14 having an open end closed by a lid or cover 16. The lower plate 12, annular can 14 and cover 16 are each of a biocompatible metal, for example titanium.

Figure 2A:
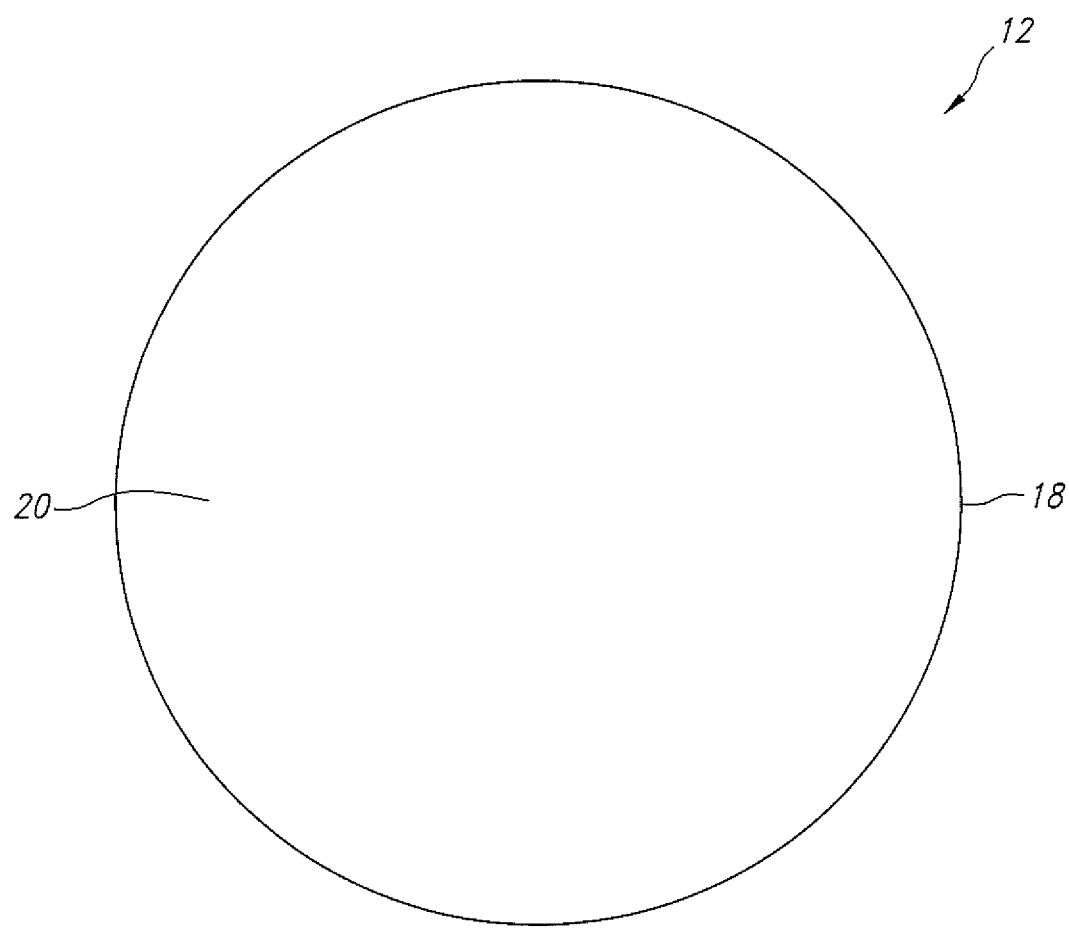
FIGS. 2A and 2B show a plan view and a side elevational view, respectively, of a lower plate 12 for the electrochemical cell 10 illustrated in FIG. 1.
Figure 2B:
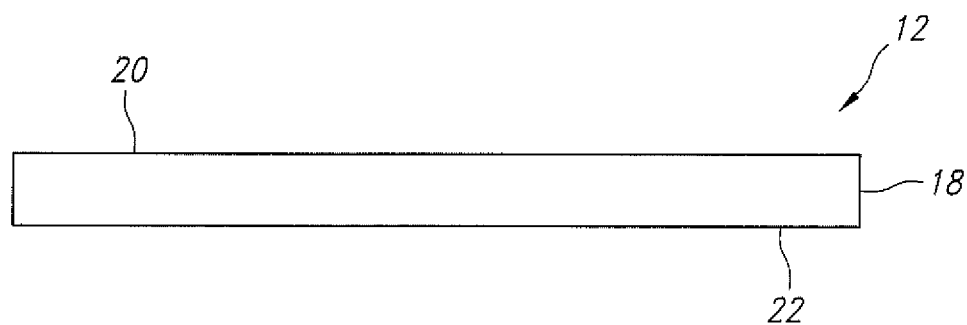

FIGS. 2A and 2B show the lower plate 12 in greater detail. Plate 12 has an annular peripheral edge 18 meeting an upper planar face 20 spaced from a lower planar face 22.

Figure 3A:
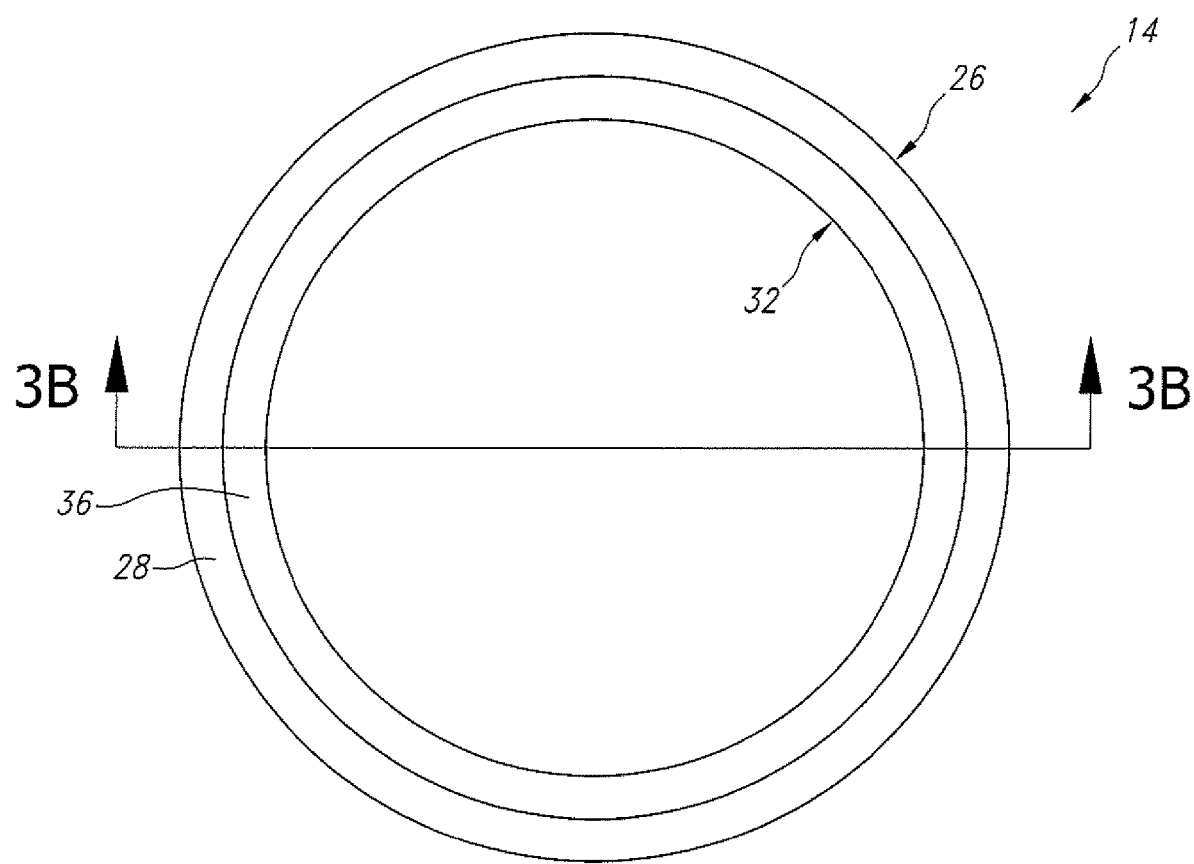
FIG. 3A is a plan view of a can 14 for the electrochemical cell 10 illustrated in FIG. 1.
Figure 3B:
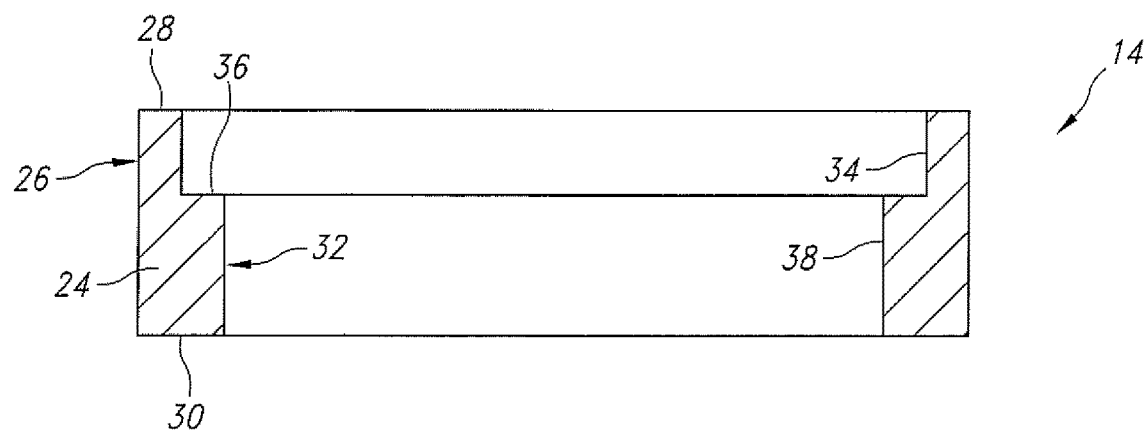
FIG. 3B is a cross-sectional view along line 3B-3B of the can shown in FIG. 3A.

FIGS. 3A and 3B show the can 14 comprising an annular sidewall 24 having a cylindrically-shaped outer surface 26 extending to an upper edge 28 spaced from a lower edge 30. The upper and lower edges 28, 30 reside along respective imaginary planes that are substantially parallel to each other. An inner surface 32 of the annular sidewall 24 has a first or upper inner cylindrically-shaped portion 34 extending partway along the height of the sidewall 24 to a step 36 that extends to a second or lower inner cylindrically-shaped portion 38. The upper inner cylindrically-shaped portion 34 has a greater diameter than the lower inner cylindrically-shaped portion 38.

Figure 4A:
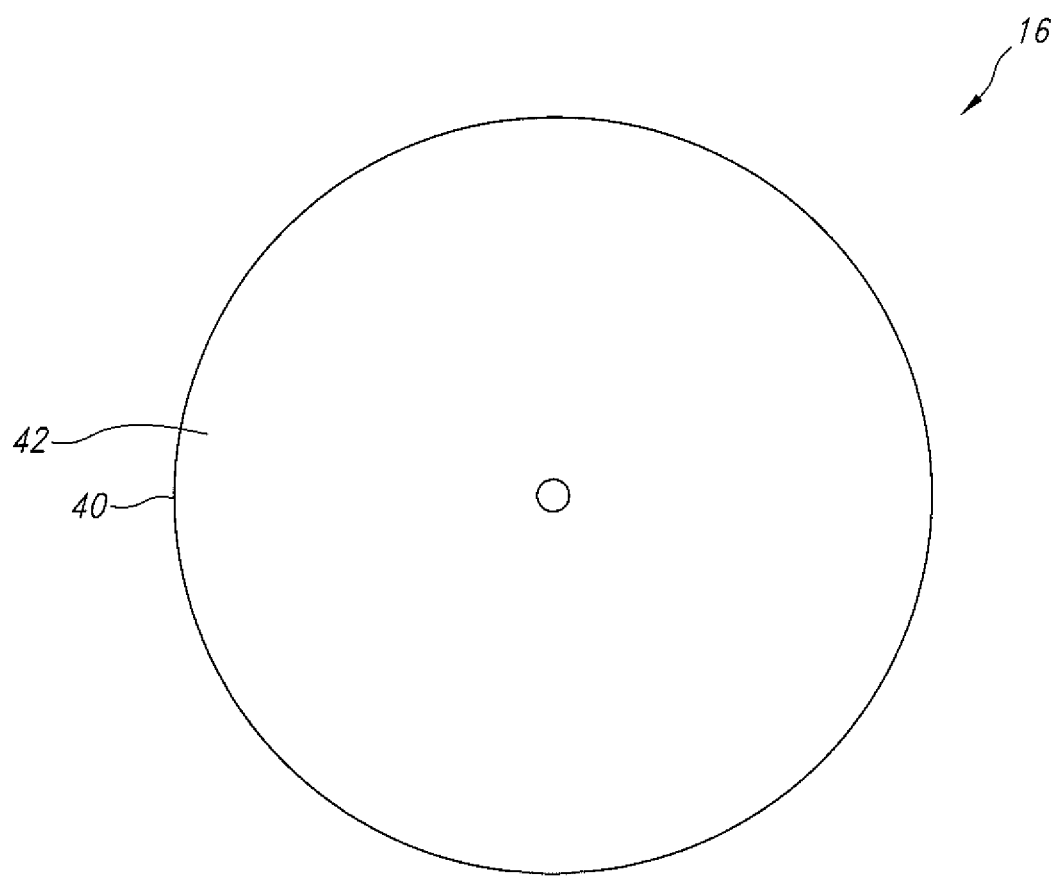
FIGS. 4A and 4B illustrate a plan view and a side elevational view, respectively, of an upper cover 16 for the electrochemical cell 10 illustrated in FIG. 1.
Figure 4B:
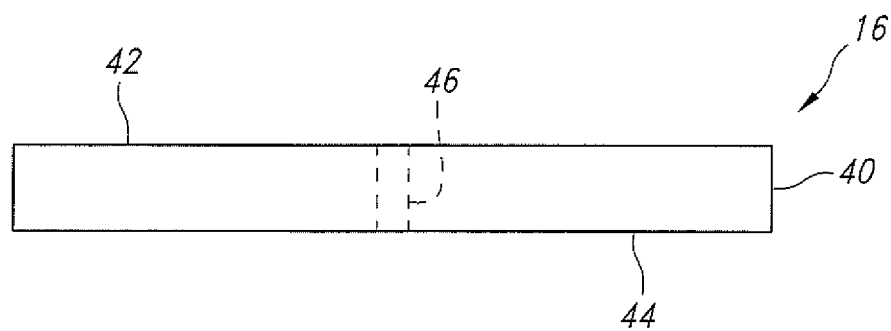

FIGS. 4A and 4B illustrate the upper plate-shaped cover 16 in greater detail. Cover 16 has an annular peripheral edge 40 meeting an upper planar face 42 and a lower planar face 44. An electrolyte fill hole or opening 46, which will be described in greater detail hereinafter, extends through the thickness of the cover 16. While shown substantially centered in the cover 16, that is not necessary. To serve as a fill port, opening 46 need only provide an open path from the upper planar face 42 to the lower planar face 44.

In an alternate embodiment, there is no electrolyte fill opening. Instead, the electrode assembly is saturated with a suitable electrolyte before the closure cover 16 is seated on the step 36 and hermetically connected to the can 14.

A dielectric material 50, for example an alumina ($Al_2O_3$) material, is coated on the outer surface 26, the lower edge 30 and the inner surface 32 of the lower inner cylindrically-shaped portion 38 of the can 14. While the dielectric material 50 is shown in FIG. 1 extending along the lower inner cylindrically-shaped portion 38 of the can 14 to the step 36, to function properly it needs only to extend along that surface to a height that is greater than the thickness of the active material (either cathode or anode) that will subsequently nest in the lower portion of the plate/can subassembly.

FIG. 1 further shows that the lower plate 12 has a diameter at its annular edge 18 that is substantially similar to an outer diameter of the can 14 at the annular sidewall 24. To secure the plate 12 to the can 14, an endless annular ring of sealing glass 48 is contacted or positioned on the upper planar face 42 of the disk-shaped cover. An outer edge of the sealing glass 48 is substantially aligned or coincident with the annular peripheral edge 18 of the plate 12. Depositing the sealing glass 48 can be achieved by several different methods including screen printing, dispensing, dipping into a frit paste or the use of a preformed endless glass ring. Suitable sealing glasses include both vitreous and crystallizing compositions that exhibit good electrical isolation properties and form mechanical bonds with good wetting characteristics to the component metals. Examples include, but are not limited to, Ferro IP510, Corning 1890, Schott 8422 and Schott 8629.

The plate 12, sealing glass 48 and can 14 subassembly is then heated to a temperature that is sufficient to burn off any organic binders that may be present and to flow the glass 48 to achieve a glass-to-metal seal between the plate and can. The seal bond line combined with the glass bond line are sufficient to ensure electrical isolation between the plate 12 and the can 14.

After the plate 12 and can 14 are secured together, a layer of cathode active material 52 is supported on the lower plate. The cathode active material 52 preferably extends to the dielectric coating 50 on the inner surface 32 of the lower inner cylindrically-shaped portion 38 of the can 14. The cathode active material 52 can be deposited using multiple methods (i.e. dispensed, pressed, preformed, sprayed, sputtered, etc.) to have a thickness that ranges from about 5 μm to about 1 mm. Suitable cathode active materials are selected from lithium nickel manganese cobalt oxide ($LiNi_aMn_bCo_{1-a-b}O_2$), $LiCoO_2$, $LiNiO_2$, $LiMnO_2$, TiS, FeS, $FeS_2$, $CF_x$, $Ag_2O$, $Ag_2O_2$, $Ag_2CrO_4$, silver vanadium oxide (SVO), copper silver vanadium oxide (CSVO), $V_2O_5$, $MnO_2$.

In desired, the cathode active material 52 is mixed with a binder material and a solvent prior to being incorporated into the electrochemical cell. Binders such as, but not limited to, a powdered fluoro-polymer, more preferably powdered polytetrafluoroethylene or powdered polyvinylidene fluoride and solvents, such as but not limited to, trimethylphosphate (TMP), dimethylformamide (DMF), dimethylacetamide (DMAc), tetramethylurea (TMU), dimethylsulfoxide (DMSO), or n-methyl-2-pyrrolidone (NMP) may be used. In addition, up to about 10 weight percent of a conductive diluent may be added to the cathode active material 52 to improve conductivity. Suitable materials for this purpose include acetylene black, carbon black, and graphite or, a metallic powder such as powdered nickel, aluminum, titanium, and stainless steel.

A separator 54 is placed on top of the cathode active material 52. As with the cathode active material, the separator 54 preferably extends to the dielectric coating 50 on the inner surface 32 of the lower inner cylindrically-shaped portion 38 of the can 14. The separator 54 has a thickness that ranges from about 5 µm to about 30 µm. Illustrative separator materials include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.). Other separator materials that are useful with the present invention include woven fabric separators comprising halogenated polymeric fibers, as described in U.S. Pat. No. 5,415,959 to Pyszczek et al., which is assigned to the assignee of the present invention and incorporated herein by reference. Examples of halogenated polymeric materials that are suitable for the present invention include, but are not limited to, polyethylene tetrafluoroethylene which is commercially available under the name Tefzel, a trademark of the DuPont Company; polyethylenechlorotrifluoroethylene which is commercially available under the name Halar, a trademark of the Allied Chemical Company, and polyvinylidene fluoride.

Next, a layer of anode active material 56 is supported on the lower or bottom surface of the cover 16. This subassembly is assembled into contact with the separator 54, opposite the cathode active material 52, when the cover is seated on the step 36 of the can 14. The anode active material 56 is deposited on the cover using any one of a number of suitable techniques including being pressed into contact with the cover, preformed into a sheet that is then pressed into contact with the cover, sprayed onto the cover, sputtered onto the cover, or coated to a thickness that ranges from about 5 µm to about 1 mm. Illustrative anode active material include carbon-based materials selected from coke, graphite, acetylene black, carbon black, glass carbon, hairy carbon, and mixtures thereof, or lithiated materials selected from $Li_4Ti_5O_{12}$, lithiated silver vanadium oxide, lithiated copper silver vanadium oxide, lithiated copper sulfide, lithiated iron sulfide, lithiated iron disulfide, lithiated titanium disulfide, lithiated copper vanadium oxide, $Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$, and mixtures thereof. Lithium is also a suitable anode active material.

The combined thicknesses of the cathode active material 52, separator 54 and the anode active material 56 is somewhat less that the height of the second or lower inner cylindrically-shaped portion 38 of the can 14 as measure from the lower plate 12 to the step 36. That way, there is sufficient free space inside the casing to accommodate expansion and contraction of the electrode stack or anode/cathode electrode assembly as the cell is subjected to charge and discharge cycles.

Alternatively, the combined thicknesses of the cathode active material 52, separator 54 and the anode active material 56 are substantially equal to or slightly greater than the height of the second or lower inner cylindrically-shaped portion 38 of the can 14 as measure from the lower plate 12 to the step 36. That way, there is sufficient stack pressure inside the cell 10 to provide intimate contact between the anode/cathode electrode assembly to thereby ensure acceptable charge and discharge cycling.

The cell enclosure or casing is completed with the upper cover 16 seated on the step 36. The upper cover 16 has a diameter that is sized to fit into the first or upper inner cylindrically-shaped portion 34 of the can 14, seated on the step 36. In this nested position, the upper planar face 42 is substantially co-planar with the upper edge 28 of the can 14. As shown in FIG. 1, the cover 16 is hermetically secured or sealed to the can 14 with an annular weld 58.

An activating electrolyte (not shown) is then filled into the casing through the cover fill opening 46. The fill opening 46 is preferably closed with a closure plug 60 that has been press-fit into the opening followed by being welded to the cover 16. Alternately, the fill opening 46 can be closed by directing a laser beam at the cover to cause its material to flow into and hermetically seal the opening.

The activating electrolyte is a nonaqueous and ionically conductive material mixture serving as a medium for migration of ions between the anode and the cathode during conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive lithium salt dissolved in a mixture of aprotic organic solvents comprising a low viscosity solvent and a high permittivity solvent. The inorganic, ionically conductive lithium salt serves as the vehicle for migration of the anode ions to intercalate or react with the cathode active materials. Suitable lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$ and $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, y-valerolactone, y-butyrolactone (GBL), N-methylpyrrolidinone (NMP), and mixtures thereof. In the present invention, the preferred anode is lithium metal and the preferred electrolyte is 0.8M to 1.5M $LiAsF_6$ or $LiPF_6$ dissolved in a 30:70 mixture, by volume, of propylene carbonate as the preferred high permittivity solvent and 1,2-dimethoxyethane as the preferred low viscosity solvent.

With the electrochemical cell 10 comprising the anode 56/cathode 52 electrode assembly activated with the electrolyte and hermetically sealed in the casing comprising the lower plate 12 supporting the can 14 and closure cover 16, the plate in contact with the cathode active material 52 serves as the positive terminal and the cover in contact with the anode active material 56 serves as the negative terminal for the cell.

As those skilled in the art will readily understand, depending on the desired polarity of the finished cell, the cathode active material can be switched with the anode active material. In this alternate embodiment, the anode active material is in contact with the lower plate 12 serving as the negative terminal and cathode active material is in contact with the cover 16 serving as the positive terminal. In this alternate embodiment, the lower plate 12 is the anode or negative terminal and the can 14/cover 16 subassembly is the cathode or positive terminal.

Thus, with the lower planar face 22 of the lower plate 12 having a surface area ranging from about 1 mm$^2$ to about 1 cm$^2$, the upper planar face 42 of cover 16 and the upper edge 28 of can 14 having a combined surface area ranging from about 1 mm$^2$ to about 1 cm$^2$, and with the height of the cell as measured from the lower planar face 22 to the upper edge 28 ranging from about 250 μm to about 2.5 mm, the present invention cell 10 represents an advancement in electrochemical technology in that the cell can be built with a total volume that is less than 0.5 cc but, as a hermetically sealed enclosure, is capable being implanted for extended periods of time.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:
   a) a casing, comprising:
      i) a sidewall extending to an upper open end spaced from a lower open end, the sidewall having an inner surface;
      ii) an upper plate closing the upper open end of the sidewall;
      iii) a lower plate;
      iv) a dielectric material coating the lower open end of the sidewall and at least a portion of the inner surface of the sidewall; and
      v) a ring-shaped sealing glass positioned between and in a glass-to-metal sealed relationship with the lower plate and in a hermetically sealed relationship with the dielectric material coating the lower open end of the sidewall; and
   b) an electrode assembly housed inside the casing, the electrode assembly comprising an anode active material segregated from directed physical contact with a cathode active material by an intermediate separator, wherein one of the anode and cathode active materials contacts the upper plate serving as one terminal for the cell and the other of the anode and cathode active materials contacts both the dielectric material coating the inner surface of the sidewall and the lower plate serving as the other terminal for the cell; and
   c) an activating electrolyte contacting the electrode assembly.

2. The electrochemical cell of claim 1, wherein the dielectric material is an alumina ($Al_2O_3$).

3. The electrochemical cell of claim 1, wherein the sealing glass is a vitreous and crystallizing composition.

4. The electrochemical cell of claim 1, wherein an outer peripheral edge of the lower plate is of substantially the same size as an outer surface of the sidewall.

5. The electrochemical cell of claim 1, wherein an outer surface of the sidewall is cylindrical.

6. The electrochemical cell of claim 1, wherein an inner surface of the sidewall is provided with a step and wherein the upper plate is seated on the step.

7. The electrochemical cell of claim 6, wherein, with the upper plate seated on the step, an upper surface of the upper plate is substantially co-planar with the upper open end of the sidewall.

8. The electrochemical cell of claim 1, wherein the upper plate is welded to the sidewall to thereby close the upper open end thereof.

9. The electrochemical cell of claim 1, wherein the upper plate has a fill port for filling the electrolyte into the casing.

10. The electrochemical cell of claim 9, wherein the fill port is welded closed.

11. The electrochemical cell of claim 9, wherein the fill port is provided with a closure plug that is welded to the upper plate to hermetically seal the casing.

12. The electrochemical cell of claim 9, wherein the anode active material is selected from the group of coke, graphite, acetylene black, carbon black, glass carbon, hairy carbon, $Li_4Ti_5O_{12}$, lithiated silver vanadium oxide, lithiated copper silver vanadium oxide, lithiated copper sulfide, lithiated iron sulfide, lithiated iron disulfide, lithiated titanium disulfide, lithiated copper vanadium oxide, $Li_xCu_wAg_yV_2O_z$ with $0.5 \leq x \leq 4.0$, $0.01 \leq w \leq 1.0$, $0.01 \leq y \leq 1.0$ and $5.01 \leq z \leq 6.5$, lithium, and mixtures thereon, and wherein the cathode active material is selected from the group of lithium nickel manganese cobalt oxide ($LiNi_aMn_bCo_{1-a-b}O_2$), $LiCoO_2$, $LiNiO_2$, $LiMnO_2$, TiS, FeS, $FeS_2$, $CF_x$, $Ag_2O$, $Ag_2O_2$, $Ag_2CrO_4$, silver vanadium oxide (SVO), copper silver vanadium oxide (CSVO), $V_2O_5$, $MnO_2$.

13. The electrochemical cell of claim 1 having a total volume that is less than 0.5 cc.

14. An electrochemical cell, comprising:
   a) a casing, comprising:
      i) a sidewall extending to an upper open end spaced from a lower open end, wherein an inner surface of the sidewall is provided with a step;
      ii) an upper plate seated on the step to close the upper open end of the sidewall;
      iii) a lower plate;
      iv) an alumina ($Al_2O_3$) coating at least a portion of an inner surface of the sidewall and extending to the lower open end thereof; and
      v) a ring-shaped sealing glass positioned between and in a glass-to-metal sealed relationship with the lower plate and in a glass-to-ceramic sealed relationship with the alumina at the lower open end of the sidewall; and
   b) an electrode assembly housed inside the casing, the electrode assembly comprising an anode active material segregated from directed physical contact with a cathode active material by an intermediate separator, wherein one of the anode and cathode active materials contacts the upper plate serving as one terminal for the cell and the other of the anode and cathode active materials contacts both the alumina coating at least a portion of the inner surface of the sidewall and the lower plate serving as the other terminal for the cell; and
   c) an activating electrolyte contacting the electrode assembly.

15. The electrochemical cell of claim 14, wherein the upper plate is welded to the sidewall to thereby close the upper open end thereof.

16. The electrochemical cell of claim 14, wherein the sealing glass is a vitreous and crystallizing composition.

17. An electrochemical cell, comprising:
   a) a casing, comprising:
      i) a sidewall extending to a lower open end opposite an upper closure plate; and
      ii) a lower plate; and
   b) an electrode assembly comprising an anode active material segregated from directed physical contact with a cathode active material by an intermediate separator, wherein one of the anode and cathode active materials contacts the lower plate and the other of the anode and cathode active materials contacts the upper closure plate; and c) a dielectric material coating the lower open end of the sidewall and at least a portion of the inner surface of the sidewall, wherein the intermediate separator contacts the dielectric material coating the inner surface of the sidewall;

d) a sealing glass hermetically sealing the dielectric material coating the lower open end of the sidewall to the lower plate; and e) an activating electrolyte contacting the electrode assembly.

18. The electrochemical cell of claim 17, wherein the dielectric material is an alumina ($Al_2O_3$).

19. The electrochemical cell of claim 17, wherein the upper plate has a fill port for filling the electrolyte into the casing, and wherein the fill port is welded closed.

20. The electrochemical cell of claim 17, wherein the upper plate has a fill port for filling the electrolyte into the casing, and wherein a closure plug is welded to the upper plate in the fill port to hermetically seal the casing.

* * * * *